United States Patent [19]
Berdan, II et al.

[11] Patent Number: 5,983,586
[45] Date of Patent: Nov. 16, 1999

[54] FIBROUS INSULATION HAVING INTEGRATED MINERAL FIBERS AND ORGANIC FIBERS, AND BUILDING STRUCTURES INSULATED WITH SUCH FIBROUS INSULATION

[75] Inventors: Clarke Berdan, II, Granville; Larry J. Grant, Westerville, both of Ohio

[73] Assignee: Owens Corning Fiberglas Technology, Inc., Summit, Ill.

[21] Appl. No.: 08/976,671

[22] Filed: Nov. 24, 1997

[51] Int. Cl.⁶ ............................................. E04B 1/74
[52] U.S. Cl. .................... 52/407.3; 52/406.2; 428/74; 428/76; 428/292.1; 428/920; 252/62
[58] Field of Search .................... 428/292.1, 74, 428/76, 920, 219; 252/62; 52/404.1, 406.2, 406.1, 406.3, 407.3; 442/416, 417

[56] References Cited

U.S. PATENT DOCUMENTS

| | | |
|---|---|---|
| 2,083,132 | 10/1937 | Williams et al. . |
| 4,058,386 | 11/1977 | Faulkner et al. . |
| 4,474,846 | 10/1984 | Doerer et al. ............................. 428/284 |
| 4,568,581 | 2/1986 | Peoples, Jr. . |
| 4,751,134 | 6/1988 | Chenoweth et al. . |
| 4,777,086 | 10/1988 | Madden et al. . |
| 4,875,320 | 10/1989 | Sparkes ................................... 52/406.1 |
| 4,888,235 | 12/1989 | Chenoweth et al. . |
| 4,917,715 | 4/1990 | Kaveh et al. . |
| 5,099,629 | 3/1992 | Gay ........................................ 52/406.2 |
| 5,123,949 | 6/1992 | Thiessen et al. . |
| 5,232,638 | 8/1993 | Thiessen et al. . |
| 5,236,754 | 8/1993 | McBride et al. . |
| 5,242,633 | 9/1993 | Rook et al. . |
| 5,277,955 | 1/1994 | Schelhorn et al. . |
| 5,326,241 | 7/1994 | Rook et al. . |
| 5,362,539 | 11/1994 | Hall et al. . |
| 5,437,922 | 8/1995 | Jackson et al. . |
| 5,458,822 | 10/1995 | Bakhshi et al. . |
| 5,458,960 | 10/1995 | Nieminen et al. . |
| 5,480,466 | 1/1996 | Jackson et al. . |
| 5,490,961 | 2/1996 | Bakhshi et al. . |
| 5,501,872 | 3/1996 | Allen et al. . |
| 5,508,079 | 4/1996 | Grant et al. ......................... 52/406.1 X |
| 5,516,580 | 5/1996 | Frenette et al. .......................... 428/288 |
| 5,523,031 | 6/1996 | Ault et al. . |
| 5,523,032 | 6/1996 | Ault et al. . |
| 5,536,550 | 7/1996 | Houpt et al. .............................. 428/74 |
| 5,545,279 | 8/1996 | Hall et al. . |
| 5,595,584 | 1/1997 | Loftus et al. . |
| 5,614,132 | 3/1997 | Bakhshi et al. . |
| 5,642,601 | 7/1997 | Thompson, Jr. et al. . |
| 5,679,126 | 10/1997 | Loftus et al. . |
| 5,736,475 | 4/1998 | Bakhshi et al. ......................... 442/415 |
| 5,765,318 | 6/1998 | Michelsen .......................... 52/406.2 X |

FOREIGN PATENT DOCUMENTS

95/30787  11/1995  WIPO .

Primary Examiner—Robert Canfield
Attorney, Agent, or Firm—Inger H. Eckert; Stephen W. Barns

[57] ABSTRACT

Fibrous insulation suitable for use in insulation cavities in buildings includes mineral fibers in an amount within the range of from about 90 to about 99 percent by weight, and organic material, in the form of organic fibers and organic particles, in an amount within the range of from about 1 to about 10 percent by weight. The mineral fibers and the organic material are integrated together so that the organic material is distributed generally uniformly among the mineral fibers. At least a majority, or about 50 percent by weight and, more preferably, a substantial amount, or about 75 percent by weight, of the organic material is in the form of organic fibers. The fibrous insulation is preferably binderless and encapsulated.

19 Claims, 6 Drawing Sheets

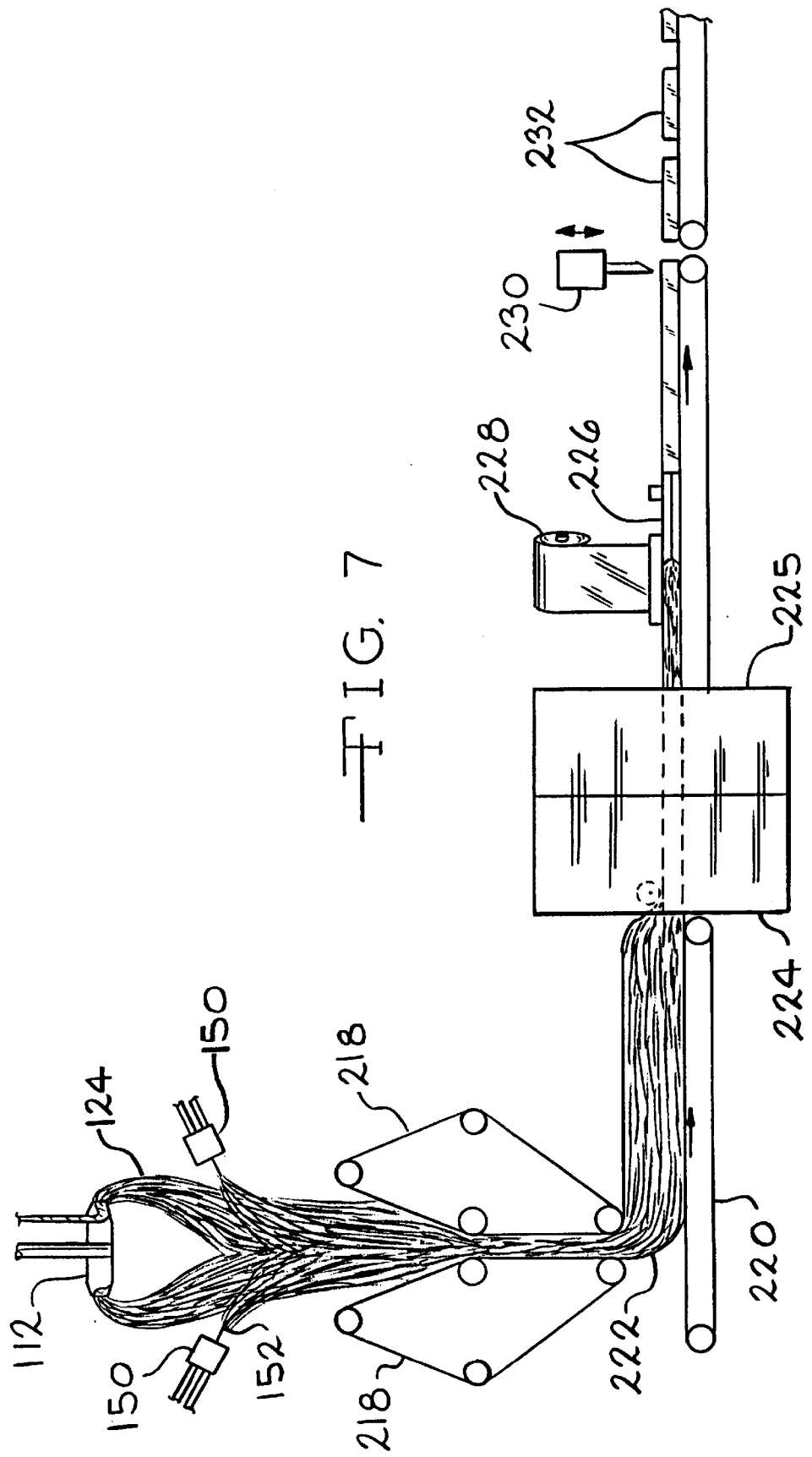

FIBROUS INSULATION HAVING INTEGRATED MINERAL FIBERS AND ORGANIC FIBERS, AND BUILDING STRUCTURES INSULATED WITH SUCH FIBROUS INSULATION

CROSS REFERENCE TO RELATED APPLICATIONS

This application is related to the inventions of the following U.S. patents and U.S. patent applications: U.S. Pat. No. 5,900,206, entitled METHOD OF MAKING A FIBROUS PACK, issued on May 4, 1999, and hereby incorporated by reference; U.S. Pat. No. 5,876,529, entitled METHOD OF FORMING A PACK OF ORGANIC AND MINERAL FIBERS, issued on Mar. 2, 1999, and hereby incorporated by reference; and Ser. No. 08/976,668, entitled METHOD AND APPARATUS FOR INTEGRATING ORGANIC FIBERS WITH MINERAL FIBERS, filed on Nov. 24, 1997, and hereby incorporated by reference.

TECHNICAL FIELD AND INDUSTRIAL APPLICABILITY OF THE INVENTION

This invention relates to the production of fibrous insulation products and, in particular, fibrous insulation products having mineral fibers combined with organic material. More particularly, this invention relates to fibrous insulation suitable for use in insulation cavities in buildings where the mineral fibers and the organic material are integrated together.

BACKGROUND OF THE INVENTION

Mineral fiber products, particularly products made of glass fibers, are typically made as either continuous fibers or discontinuous fibers. Various organic coatings are applied to these fibers for protecting the fibers from abrasion, for connecting the mineral fibers to each other to form a structural product, and for providing compatibility of the mineral fibers with other materials, such as the compatibility between the reinforcement fiber and a plastic matrix. In the case of insulation products, the mineral fibers are bonded together by organic material, such as a phenol/formaldehyde binder, to form a spring-like matrix which can recover after compression during packaging. One mat product having both glass fibers and fibers of organic material, and manufactured by a textile non-woven process, is disclosed in U.S. Pat. No. 4,751,134 to Chenoweth et al.

The application of organic material to the mineral fibers can take several forms. Continuous mineral fibers can be run through a bath or across a coater to apply a coating to the fibers, such as during the application of a size to continuous fibers. Also, the organic material can be sprayed onto the mineral fibers. This method is commonly used in the manufacture of insulation products where a cylindrical veil of mineral fibers is met with the sprays of the phenol/formaldehyde binder. Typically, the phenol/formaldehyde binder contains urea, and has a molecular weight of around 600 in the uncured state in the aqueous solution being applied to the glass fibers.

One of the problems with applying aqueous organic binders of the prior art to cylindrical veils of mineral fibers is that a portion of the binder tends to evaporate prior to contact between the liquid binder drop and a mineral fiber in the veil. The evaporated binder material becomes a contaminant in the exhaust air stream of the process and must be cleaned up in order to avoid pollution problems. Also, the binder material on the mineral fibers tends to be sticky, requiring extensive cleaning of the fiber collection apparatus to prevent the build-up of clumps of glass fiber insulation material which can drop into the product and cause a product defect.

Another problem associated with the application of binder to insulation products is that the low molecular weight phenol/formaldehyde binder material does not have some of the desirable characteristics of other, higher molecular weight polymeric material, such as polyethylene terephthalate (PET), polypropylene or polyphenylene sulfide (PPS). A primary problem with the low molecular weight binder material is that a curing process is required, and this usually has operating penalties such as the capital and operating cost of a curing oven, the cost of handling pollution problems, degree of cure problems and product integrity problems. If higher molecular weight polymers could be applied to mineral fibers to produce insulation products, some improved features could be realized.

Heretofore, attempts to apply higher molecular weight binders to mineral fibers to produce an insulation product have not met with great success. One of the problems with the attempts to apply higher molecular weight polymers, as well as the lower molecular weight phenol/formaldehyde binders to veils of glass fibers, has been that the application of the material is very uneven, resulting in differences in the amount of the binder material applied to different portions of the insulation product. It would be advantageous to be able to apply these binder materials in a more uniform manner to produce a more uniformly distributed bindered product.

Attempts have been made in the past to integrate organic binder materials with mineral fibers from a rotary process without merely spraying the veil of fibers with an aqueous solution of the binder material. For example, U.S. Pat. No. 5,123,949 to Thiessen discloses a rotary fiberizing process where additive particles are supplied through the hollow quill or axle of the rotating spinner. The particles are directed toward the veil of mineral fibers from a locus within the veil. The additive particles can be fibrous in nature, such as cellulose fibers, and also can be resinous material in a particulate form.

U.S. Pat. No. 5,595,584 to Loftus et al. discloses an alternate commingling process where glass rotary fiberizers centrifuging glass fibers, and polymer rotary fiberizers centrifuging polymer fibers, are positioned alternately with each other arranged along a collection surface. The polymer fiberizer can be oriented at an angle to the vertical so that the flow of polymer fibers is directed at an angle into contact with the veil of glass fibers. While the purpose of the alternate commingling process was to decouple the polymer fiber forming environment from the glass fiber forming region, it was perceived to be quite difficult to uniformly integrate the rotary-formed polymer fibers into the veil of glass fibers. The nonuniformities of the rotary polymer process combined with the swirling, chaotic environment of the glass fiber forming would prohibit significant penetration of the polymer fibers into the glass fibers.

Conventional fibrous insulation products for such uses as insulating wall cavities and attic or ceiling spaces in buildings include batts that are compressible for shipping and storage. Such products typically have urea/phenol-formaldehyde binders applied during manufacturing, as explained above. These conventional insulation batts have a high degree of recovery upon opening of the package so that the product will expand to the designed thickness to fill the wall cavity or ceiling cavity and provide the desired insulation value. To achieve even greater economics, it would be advantageous to be able to increase the thermal insulation value of such building insulation products at little or no increase in manufacturing costs. Also, in view of the manufacturing and environmental costs, it would be particularly beneficial to be able to reduce or eliminate the use of organic binder materials. Also, it would be advantageous if there could be developed an improved insulation product integrating polymer or other organic fibers into mineral fibers, such as glass fibers. Such a product should have good thermal properties, good product integrity, low irritation, and good handleability for application in wall or ceiling or wall cavities.

SUMMARY OF THE INVENTION

The above objects as well as other objects not specifically enumerated are achieved by a fibrous insulation suitable for use in insulation cavities in buildings, where the fibrous insulation includes mineral fibers in an amount within the range of from about 90 to about 99 percent by weight, and organic material, in the form of organic fibers and organic particles, in an amount within the range of from about 1 to about 10 percent by weight. The mineral fibers and the organic material are integrated together so that the organic material is distributed generally uniformly among the mineral fibers. At least about a majority, or 50 percent by weight, of the organic material is in the form of organic fibers, and, more preferably a substantial amount, or at least about 75 percent by weight, of the organic material is in the form of organic fibers. Preferably, the fibrous insulation is binderless and encapsulated.

According to one particular embodiment of the invention, there is also provided a binderless fibrous insulation suitable for use in insulation cavities in buildings, where the fibrous insulation includes mineral fibers in an amount within the range of from about 90 to about 99 percent by weight, and organic material, in the form of organic fibers and organic particles, in an amount within the range of from about 1 to about 10 percent by weight. The mineral fibers and the organic material are integrated together so that the organic material is distributed generally uniformly among the mineral fibers. At least a majority, or about 50 percent by weight, or more preferably a substantial amount, or at least about 75 percent by weight, of the organic material is in the form of organic fibers, and the fibrous insulation is encapsulated with a plastic film. The fibrous insulation preferably has a recovery ratio of at least 6:1.

According to another embodiment of the invention, there is provided, in combination, a building structure having insulation cavities, and fibrous insulation positioned within those cavities to insulate the building, wherein the fibrous insulation is comprised of mineral fibers in an amount within the range of from about 90 to about 99 percent by weight, and organic material, in the form of organic fibers and organic particles, in an amount within the range of from about 1 to about 10 percent by weight, and at least a majority, or about 50 percent by weight, or, more preferably, a substantial amount, or at least about 75 percent by weight, of the organic material is in the form of organic fibers.

BRIEF DESCRIPTION OF THE DRAWINGS

FIG. 7 is a schematic view in elevation of alternate apparatus for making fibrous insulation of the invention, illustrating a product shaping oven and encapsulation equipment.

DETAILED DESCRIPTION OF THE INVENTION

This invention will be described using glass fibers as an example of the mineral fibers of the invention. It is to be understood that the invention can be practiced using mineral fibers of other heat-softenable mineral material, such as rock, slag and basalt. Also, although the invention will be described using polymer fibers as the fibers to be directed into contact with the glass fibers, it is to be understood that fibers of any organic material, such as asphalt material, can be used with the invention, as long as the fibers are long or substantially continuous fibers suitable for enhancing the product properties.

Figure 1:
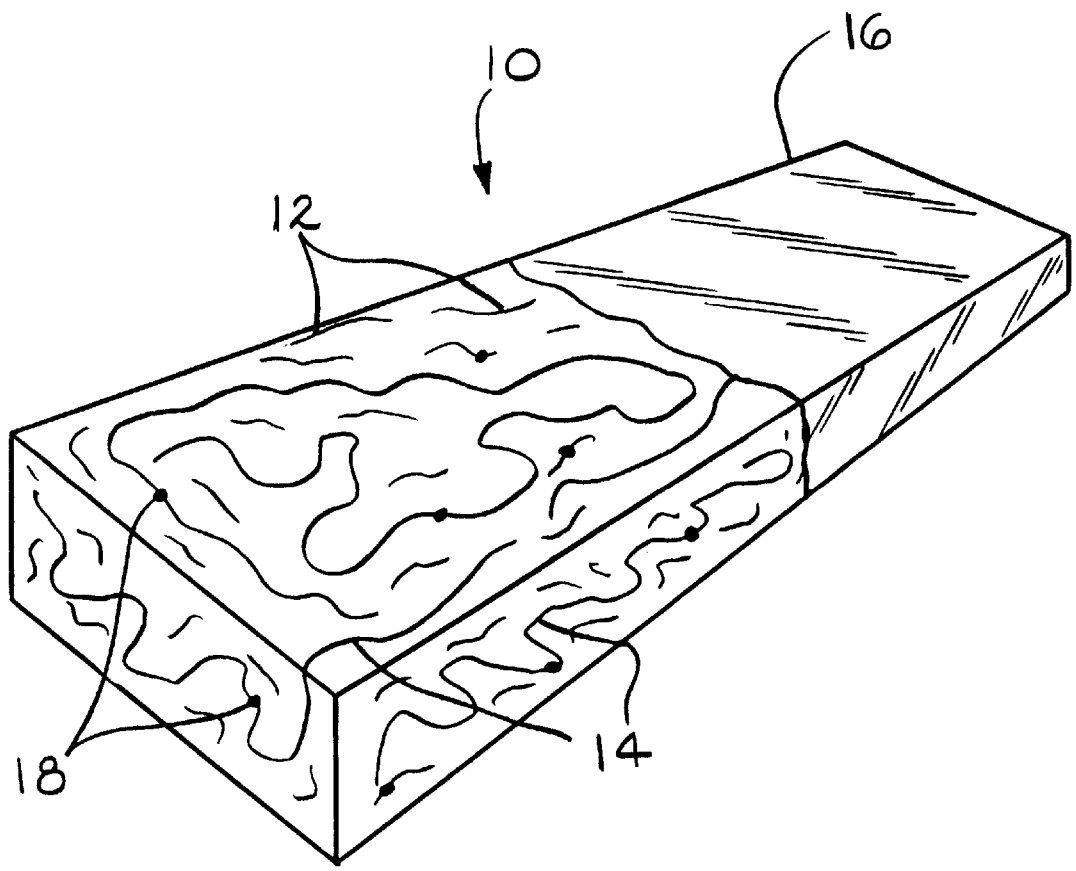
FIG. 1 is a schematic view in perspective of a fibrous insulation product of the invention.

As shown in FIG. 1, the fibrous insulation of the invention is indicated generally at 10, and can alternately be referred to as an insulation batt. The fibrous insulation batt 10 includes mineral fibers, in the form of glass fibers 12 and organic fibers, in the form of polymer fibers 14, which can be comprised of polypropylene fibers. The glass fibers and the polypropylene fibers are integrated together so that the polypropylene fibers are distributed among the glass fibers. Preferably, the polypropylene fibers are distributed generally uniformly among the glass fibers.

The uniformity of distribution can be measured in several different ways. One method is to slice the fibrous insulation horizontally into a number of thin layers of generally equal thickness, and then burn off the organic material to determine the loss on ignition (LOI) for each of the layers. The term "horizontal" means parallel to the collection surface of the fibrous insulation. For fibrous insulation having a generally uniform distribution, the LOI will not vary by more than about 50 percent among the different layers, when the fibrous insulation is divided into 3–5 layers of generally equal thickness. Preferably, the LOI will not vary by more than about 35 percent, and most preferably the LOI will not vary by more than about 25 percent. It is to be understood that there may be reasons for providing a surface layer or zone having a high concentration of mineral fibers or organic material (in either fibrous, film or particulate form). This surface layer or zone could be positioned on either or both of the surfaces of the fibrous insulation. In determining uniformity of distribution, such a surface layer or zone of high concentration is not to be considered as one of the 3–5 layers. For purposes of the invention, the term "distributed generally uniformly" means that the LOI of the various layers, when divided into 3–5 horizontal layers, varies by no more than about 4 percentage points, when surface layers or zones having high concentration of either mineral fibers or organic material are first removed, and when encapsulation layers are removed. For example, where the LOI of one of the horizontal layers is 3 percent, the LOI of the other of the 3–5 layers will be no higher than about 7 percent. For even greater uniformity the LOI of the various layers will vary by no more than about 3 percentage points, and preferably the LOI varies by no more than about 2 percentage points.

An encapsulation material 16 can be applied to the insulation batt 10. The glass fibers and polypropylene fibers will be described in more detail below. It is to be understood that the fibers used in the insulation batt can be any combination of one or more mineral fibers and one or more organic fibers, as will be explained more particularly below. Although the insulation batt can be comprised of a number of combinations of mineral fibers and organic fibers, a preferred combination comprises mineral fibers in an amount within the range of from about 90 to about 99 percent by weight, and organic fibers in an amount within the range of from about 1 to about 10 percent by weight.

During the forming or processing of the insulation batt 10 some of the polymer material may be subjected to sufficient heat to cause some of the polymer material to melt and form non-fibrous particles 18 attached to the glass fibers. It is possible that some of the mineral fibers may be completely coated with polymer material. It is desirable that only a small amount of the polymer material is melted and formed into polymer particles 18, and preferably, at least a majority, or about 50 percent, and, more preferably, a substantial amount, or at least about 75 percent, of the polymer material is in the form of polymer fibers.

Figure 2:
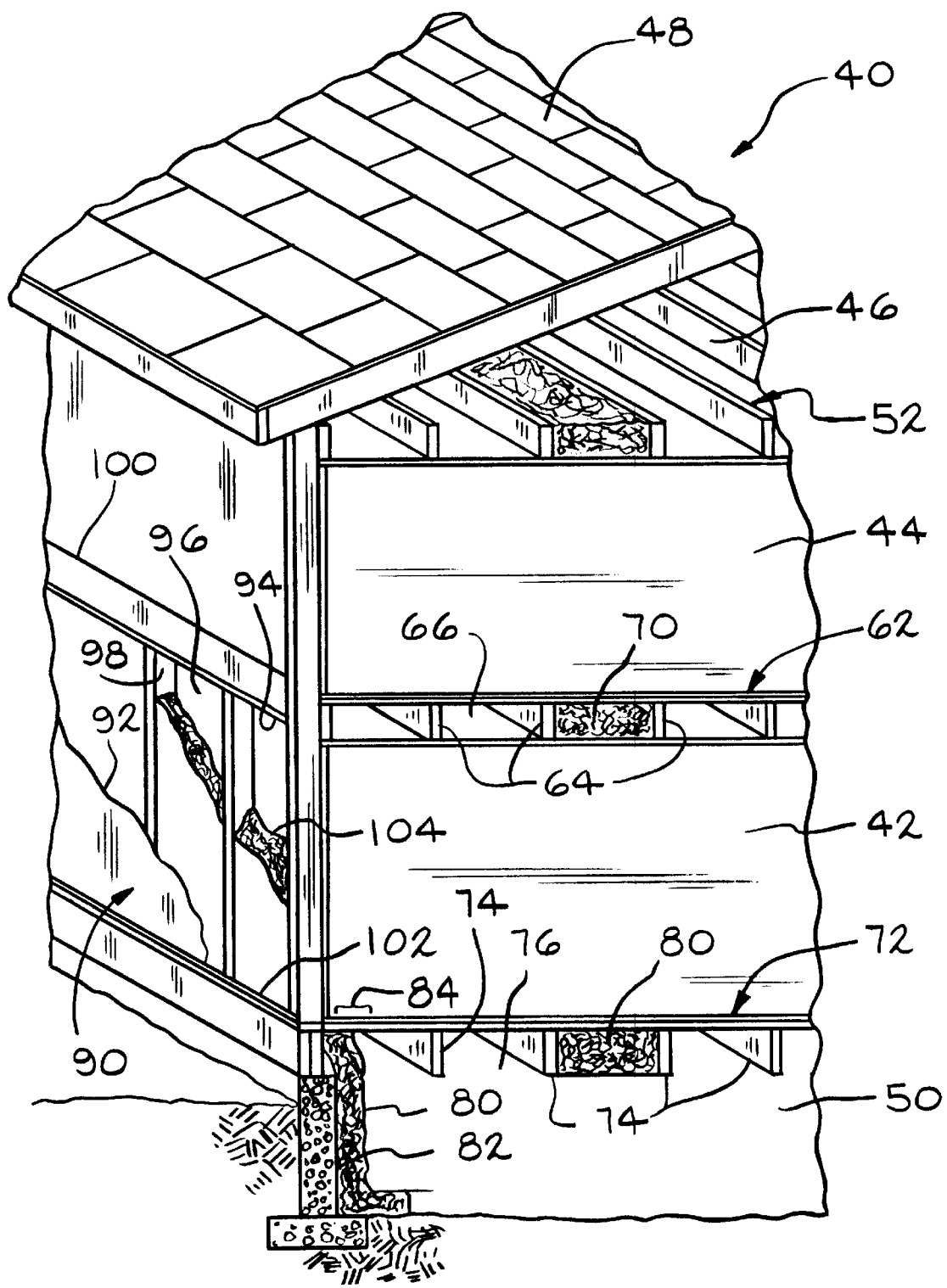
FIG. 2 is a schematic view in perspective, partially cut away, of a residential dwelling insulated in accordance with the invention.

The installation of the fibrous insulation 10 into a building structure results in a particularly advantageous combination. The building in combination with the insulation product of the invention constitutes a beneficial construction having desirable characteristics, as will now be explained. As shown in FIG. 2, a building structure, in the form of a residential dwelling, is indicated generally at 40. The residential dwelling 40 is merely representative of a building structure to be used in conjunction with the invention, and it is to be understood that numerous other building structures, such as commercial and industrial buildings, can also be used in conjunction with the invention. The residential dwelling 40 is generally comprised of the first level 42 and the second level 44. Above the first level 42 is an attic 46, which is covered by the roof 48. Beneath the first level is a crawl space 50.

The attic 46 is generally defined by the attic floor 52 and the roof 48. The attic floor 52 is traditionally made of wood, and contains various structural members, such as attic joists 54. The attic joists are generally arranged in parallel, defining attic insulation cavities 56 between the joists. Fibrous attic insulation 60 can be positioned in the insulation cavities to retard the flow of heat or thermal energy through the attic floor 52. Temperature differentials in the winter tend to drive heat upward through the attic floor, from the second level 44 into the relatively cold attic 52. Temperature differentials in the summer tend to drive heat downward through the attic floor, from the relatively hot attic to the second level.

Positioned between the first level 42 and the second level 44 is the second floor 62, containing second floor joists 64. The second floor joists are generally arranged in parallel, defining second floor insulation cavities 66 between the joists. Fibrous second floor insulation 70, similar to the fibrous insulation batt 10 shown in FIG. 1, can be positioned in the second floor insulation cavities 66. Since the first level 42 and the second level 44 are usually at similar temperatures, a primary benefit of the second floor insulation 70 is acoustical insulation rather than thermal insulation, retarding the transfer of sound through the second floor 62.

Positioned between the first level 42 and the crawl space 50 is the first floor 72, containing first floor joists 74. The first floor joists are generally arranged in parallel, defining first floor insulation cavities 76 between the joists. Fibrous first floor insulation 80, similar to the fibrous insulation batt 10 shown in FIG. 1, can be positioned in the first floor insulation cavities 76 to retard the downward flow of heat or thermal energy through the first floor 72. Temperature differentials, particularly in the winter heating season, tend to drive heat downward through the first floor, from the first level 42 into the relatively cool crawl space 50.

An alternative insulation system for the crawl space 50 is also shown in FIG. 2. In this embodiment crawl space sidewall insulation 80 is draped along the foundation wall 82. The crawl space sidewall insulation 80 is hung by means, not shown, from the level of the first floor 72 to retard heat transfer from the crawl space 50 through the foundation wall 82 into surrounding earth. The crawl space sidewall insulation 80 positioned along the foundation wall 82 occupies a space or zone 84 along the foundation wall, equal to the thickness of the insulation material, and for purposes of this invention, this zone is referred to as an insulation cavity. Typically, a crawl space is insulated either in the first floor insulation cavities 76, or in the zones 84 along the foundation walls 82, but not both. In an alternative installation method, insulation zones 84 are defined by means of furring strips or studs, not shown, and the crawl space sidewall insulation 80 can be applied in a similar manner.

The exterior walls 90 of the residential dwelling 40 can be insulated in a manner similar to the methods shown above. The outside surface 92 (such as siding or sheathing) of the exterior wall 90, and the interior surface 94 (such as dry wall) define a wall insulation cavity 96. The sides of the wall insulation cavity 96 are defined by studs 98, the header 100 and the footer 102. The fibrous exterior wall insulation batt 104 is positioned within the wall cavity 96 to retard heat flow from the interior of the dwelling, through the walls 90, during the heating season. The insulation batt 104 also functions to retard heat flow inwardly during the cooling season. Numerous means can be employed to retain the insulation batt 104 in position within the wall cavity 96 so that the insulation batt will not slide or slump or settle down into the insulation cavity. It is highly preferable for the insulation batt 104 to be of sufficient width and stiffness that it can be held in position with a friction fit, thereby eliminating the necessity of a separate means for suspending the insulation batt in the insulation cavity. The friction fit feature is also advantageous for several of the other insulation product locations discussed above, particularly when insulating the first floor cavities 76 and the foundation wall zones 84 (when wall studs are used.) From the above description it can be seen that the building structure has a plurality of wall cavities 96 defined by wall studs, where the wall cavities are filled with the fibrous insulation, wherein the fibrous insulation is held in the wall cavities by a friction fit. It can be appreciated that the combined building structure and fibrous insulation products described above create an effective unit for insulating the building structure.

Figure 3:
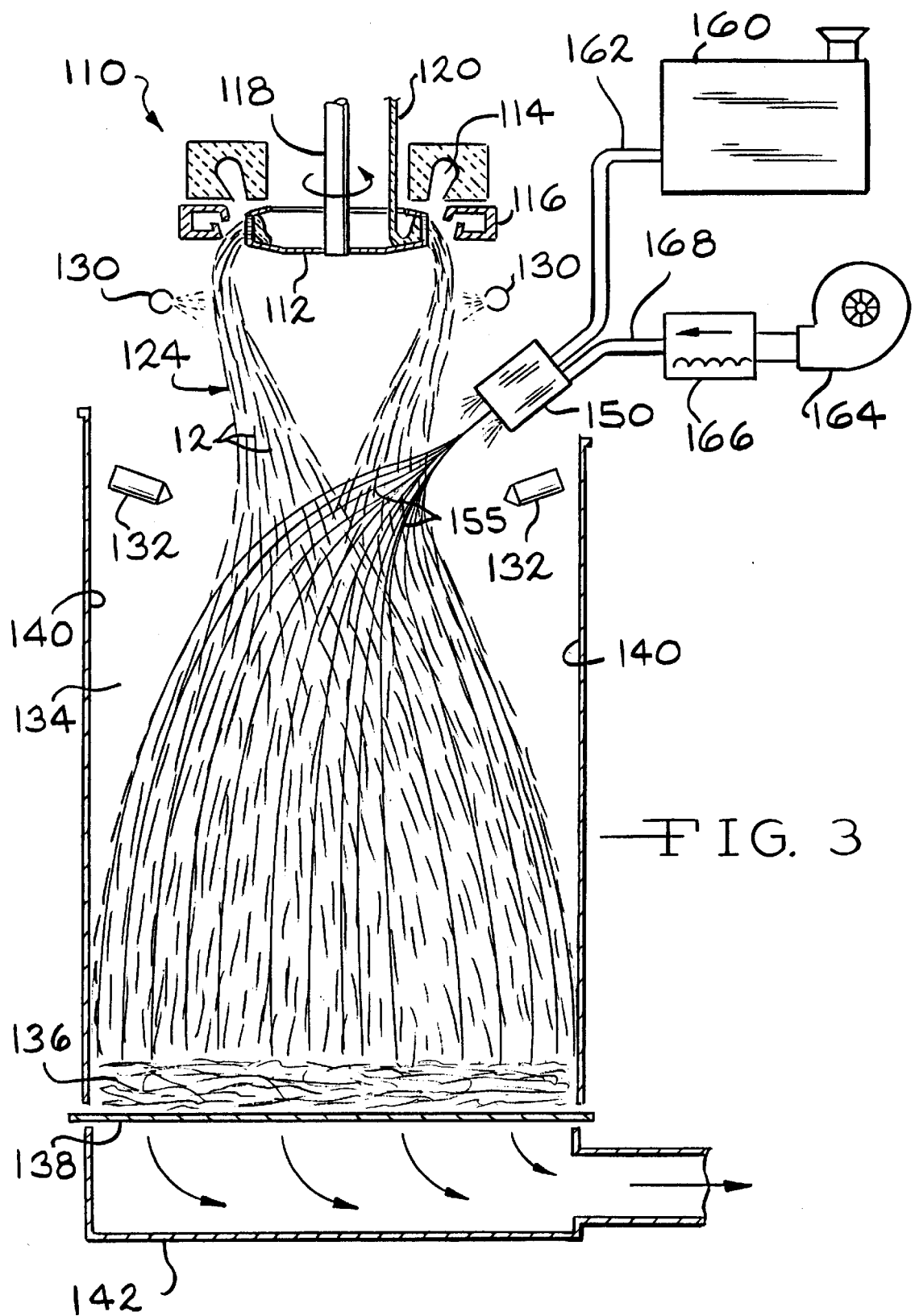
FIG. 3 is a schematic view in elevation of apparatus for integrating polymer fibers with glass fibers to make fibrous insulation according to the invention.

A preferred method and apparatus for making the fibrous insulation batt 10 is disclosed in FIGS. 3–6. As shown in FIG. 3, the fiberizing apparatus, indicated generally at 110, includes a spinner 112, an annular burner 114 and an annular blower 116. The spinner is rotated on an axle or quill 118. A stream 120 of molten glass is delivered from a glass melting furnace, not shown, and the molten stream 120 drops into the interior of the rotating spinner 12. The centrifugal forces of the rotating spinner force the molten glass to emanate from the spinner in the form of fine glass streams that are turned downwardly as glass fibers 12 by the action of the blower 116 and gases induced by the blower. The blower gases and induced air attenuate the glass fibers into their final fine diameter, typically within the range of from about 3 to about 8 microns. The burner 114 is typically gas fired and supplies heat to the spinner and the fiber forming environment.

The glass fibers travel in a downwardly moving veil 124, which is generally cylindrical in shape, and which contains not only the glass fibers, but also rapidly moving air and gases of combustion from the burner 114. The veil 124 initially has a diameter slightly larger than the diameter of the spinner. The size or diameter of the veil, and the rotational speed of the gases and fibers within the veil, change as the veil moves downwardly. These changes are due to dissipation of the original energy of the gases within the veil, and on external forces influencing the veil.

Nozzles 130 can optionally be positioned to direct liquid sprays into the veil. Such sprays could include water or other evaporative liquid to cool the fibers and associated gases within the veil. The nozzles could also spray a lubricant onto the fibers to reduce fiber-to-fiber friction in the ultimate insulation product, which could thereby prevent fiber damage. If desired, the nozzles 130 could also be used to add an optional resinous binder to the glass fibers, although the method of the invention should result in a product having integrity and recovery properties good enough that a binder is not needed. Resinous binders, such as a urea phenol formaldehyde, are well known in the art. The nozzles are supplied with the desired liquid by means not shown.

Another device for affecting the veil 124 is the set of air lappers 132 that are positioned on either side of the veil 124. The air lappers discharge air to sweep or direct the veil from side to side of the forming hood 134 so that the pack 136 collected on the moving collection surface or forming chain 138 will have an even distribution across the width of the forming chain, from one hood wall 140 to the other. The forming chain 138 is mounted for movement as a conveyor, and is foraminous so that a suction box 142, positioned beneath the forming chain, can evacuate of gasses from the hood 134 and pack 136.

Positioned on at least one side of the veil 124 is a polymer fiber generation device, preferably a polymer fiber die 150. The polymer fiber die produces an array 152 of polymer fibers 14, and directs them into contact with the glass fibers 12 to integrate the polymer fibers with the glass fibers. The velocity of the polymer fibers in the array, in the direction away from the die, is at least 50 meters/second at a distance of 20 cm downstream from the die, and preferably is at least 100 meters/second. The intermingled polymer fibers 14 and glass fibers 12 are collected together in the form of the insulation pack 136. The polymer fiber die 150 can be any device suitable for forming fibers of polymer material or other organic material capable of forming fibers. A suitable polymer die 150 is a melt blowing die capable of producing generally continuous polymer fibers having an average diameter greater than about 4 microns, and preferably within the range of from about 4 to about 25 microns, and most preferably about 6 microns. Suitable polymer dies are available from J&M Laboratories, Inc., Dawsonville, Ga., and from Biax FiberFilm Corporation, Neenah, Wis. The polymer die 150 will preferably be selected to be able to provide a polymer content, by weight, within the range of from about 1 to about 10 percent of the expected total throughput of the glass fibers and polymer fibers. For example, if the glass fiber throughput is 1000 pounds per hour (454 kg/hr) and the desired LOI of polymer fibers is 2.5 percent, then the polymer die would be configured to have a throughput of about 25.6 pounds per hour (11.7 kg/hr). A preferred fibrous insulation batt will have organic or polymer material in an amount less than about 10 percent by weight of the total weight of the fibrous insulation (not including the weight of the encapsulation material 16). In a more preferred embodiment of the invention, the organic or polymer material is present in the fibrous insulation in an amount less than about 5 percent by weight of the fibrous insulation, and most preferably, the amount of organic material is less than about 3 percent by weight of the fibrous insulation.

The polymer fibers 14 can be made of any polymeric material from which fibers of suitable length, strength, durability and insulation characteristics can be formed. It is well known in the melt blowing industry that the fibers from a melt blowing polymer die are produced in substantially continuous lengths. Suitable polymer materials for making the polymer fibers include, but are not limited to, polyethylene terephthalate (PET), polypropylene, and polyphenylene sulfide (PPS). Other polymer materials suitable for making fibers include nylon, polycarbonate, polystyrene and polyamide. Even though the invention is described using polymer fibers 14 as an example, it is to be understood that other organic materials, including resins, asphalts, and other thermoplastic and thermoset materials, can be used with the present invention.

Although a wide variety of thermoplastic compositions can be utilized in the process of the invention, polyolefin fibers such as polypropylene have been found to be particularly well suited for inclusion as binder fibers in mineral fiber insulation products. For improved adhesion of the polypropylene fibers to the mineral fibers, preferably at least a portion of the polypropylene fibers are formed from polypropylene that has been modified to introduce polar groups, as, for example, by free-radical induced grafting of ethylinically unsaturated monomers such as maleic anhydride, acrylic or methacrylic acid or esters thereof. Preferably, the polar monomer is maleic anhydride and is present at a level of from about 0.1% to about 10% by weight, more preferably, from about 0.3% to about 1.0% by weight of the modified polypropylene composition.

However, while such modified polypropylene fibers exhibit better adhesion to mineral fibers, it is generally not economically feasible in insulation products for all of the thermoplastic binder fibers to be formed of modified polypropylene. Accordingly, in such products, it is generally preferred that only from about 5% to about 30%, more preferably from about 10% to about 20% of the thermoplastic binder fibers included in the fibrous composite are formed of modified polypropylene. These may be individual, discreet fibers formed separately from the unmodified polypropylene fibers, such as by separately melt blowing polypropylene fibers and modified polypropylene fibers and combining them with glass fibers to form the composite mat, or they may be composite fibers formed by melt blowing a mixture of polypropylene and modified polypropylene.

Associated with the polymer fiber die 150 is an extruder 160 that supplies polymer material to the polymer fiber die 150 via a polymer line 162. The extruder can be any suitable extruder for heating and pressurizing the organic material and supplying it in a fiberizable form. Suitable extruders are available from the above-mentioned polymer die suppliers.

Figure 4:
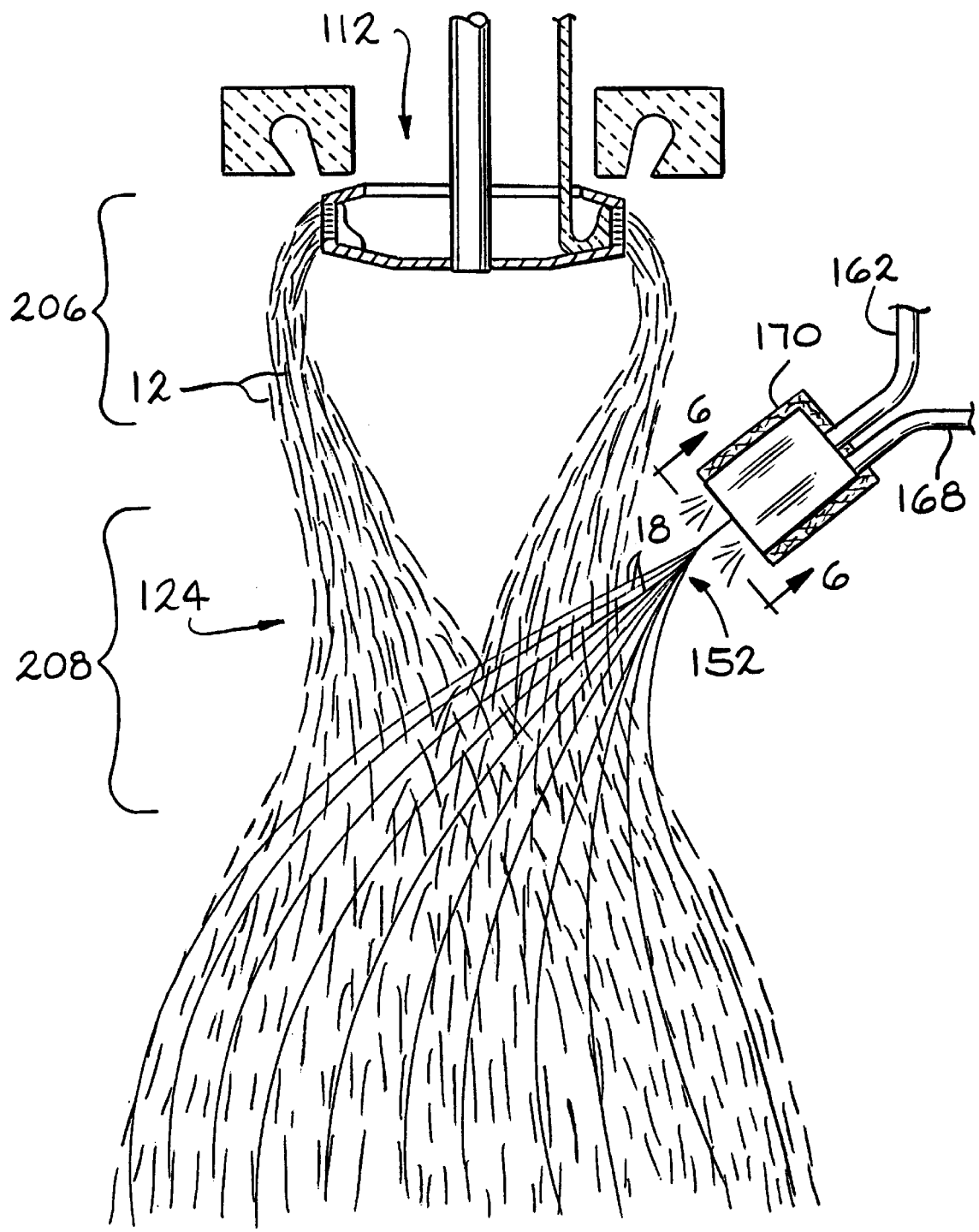
FIG. 4 is a schematic view in elevation illustrating in greater detail the integration of the polymer fibers with the glass fibers shown in FIG. 3.

Also associated with the polymer fiber die 150 is a polymer blower 164 which supplies hot pressurized air to the polymer fiber die for attenuation of the polymer fibers 14. The volume of air required is a function of the desired fiber diameter and the amount of polymer material being fiberized, as well as other factors. The air is heated with the heater 166, which is preferably an electric heater, and the heated air is supplied to the polymer die 150 via hot air line 168. The hot air exits the polymer fiber die 150 to help attenuate the polymer fibers and maintain them in a soft attenuable condition as long as is necessary for satisfactory reduction in diameter. As with the polymer fiber die 150, the polymer extruder 160, blower 164 and heater 166 are commercially available. Since the polymer fiber die 150 is positioned in a hot environment, i.e., generally near or below the fiberizer 110, the polymer fiber die is preferably provided with insulation material 170 to prevent excessive heat loss, as shown in FIG. 4.

Figure 5:
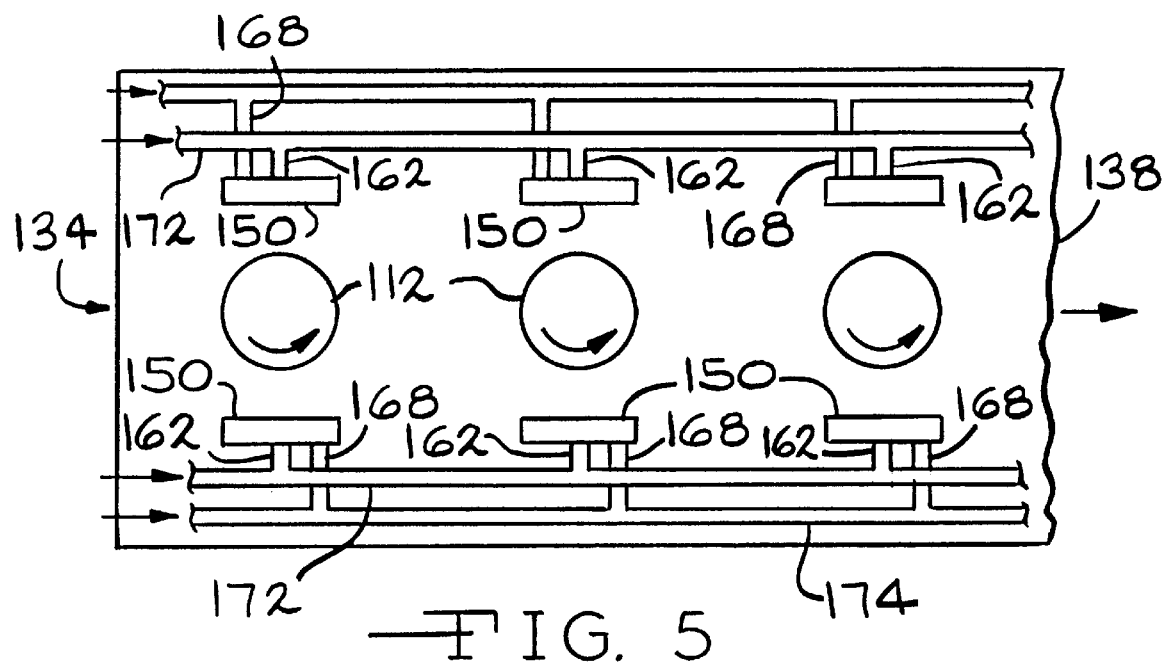
FIG. 5 is a plan view of the apparatus of FIG. 3 showing several fiberizers.

As shown in FIG. 5, a plurality of fiberizers having a plurality of spinners 112 can be arranged along the length of a forming chain 138. Associated with each spinner 112 is a pair of polymer fiber dies 150. Each die 150 is supplied with molten polymer material by a polymer line 162, and the polymer lines are all fed by a polymer manifold 172. The polymer line is connected to the polymer extruder, not shown in FIG. 5.

The polymer dies 150 are also supplied with hot air by hot air lines 168, all of which are supplied by hot air manifolds 174. The hot air manifolds 174 are supplied from one or more hot air heaters 166 and polymer blowers 164, not shown in FIG. 4. The hot air aids in the attenuation of the polymer fibers by maintaining the polymer fibers in a soft, attenuable state during the attenuation process. If the polymer fibers were to cool too quickly after leaving the die 150, the polymer fibers would be too fat. The air supplied to the die is at a volume and pressure sufficient to result in up to nearly sonic air speeds.

It can be seen from FIG. 5 that by supplying polymer fibers 14 into contact with the glass fibers 12 from both sides of each of a plurality of spinners 12, there will be substantial integration of the two different types of fibers. Further, the polymer fibers 14 will be intermixed or distributed generally uniformly with the glass fibers.

Figure 6:
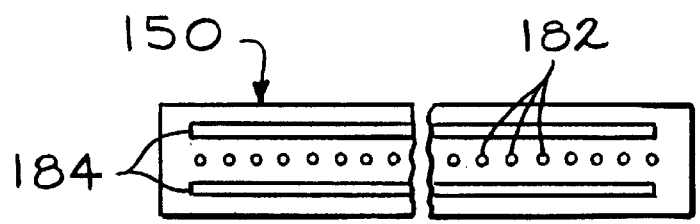
FIG. 6 is schematic bottom view of the polymer fiber die of FIG. 4, taken along line 6—6.

As shown in FIG. 6, the exit end or bottom 140 of the polymer spinner die 150 is provided with a plurality of polymer orifices 142 for the exit of molten polymer material. Positioned adjacent the row of polymer orifices are two air slots 144. The air slots emit pressurized air as gaseous flows or air jets that attenuate the polymer fibers 14 as the air jets move away from the die 150. The polymer orifices 142 can be of any size or cross-sectional shape suitable for the emission of the polymer material to form the polymer fibers 14.

The air slots 144 can be of any appropriate size for the emission of attenuation gases for the drawing out of the polymer fibers. The fibers 14 emanating from the die 150 are traveling in the array 152, in which the fibers are initially all traveling in directions substantially normal to the bottom 140 of the die 150, and in that respect they are in an aligned array. As the fibers 14 move further from the die 150, the paths of the fibers begin to diverge as the array begins to decay. The rate at which the array decays will depend on several factors, including the initial velocity of the polymer fibers, the volume of air flow with the array of fibers, the mass flow rate of the polymer material exiting the die, and the amount of air currents or turbulence surrounding the die. In a typical melt blown die 150 the parallel nature of the array 152 of fibers decays substantially at a distance of about 30 to about 40 cm from the die. As a practical matter, as the polymer fibers 14 reach the veil 124 of glass fibers, the randomness of the paths of the polymer fibers increases. It is, however, beneficial for the polymer fibers to arrive at the glass fiber veil in a state of relative alignment in order to achieve successful insertion or integration of the polymer fibers into the glass fibers. Typically, the polymer fibers are still in an aligned array at a distance of about 20 cm from the die because a majority of the polymer fibers will still be substantially normal to the bottom 140 of the die 150.

As shown in FIG. 4, the glass fiber veil 124 converges or necks down to a smaller diameter as the veil travels downwardly away from the spinner 112. More specifically, the glass fiber veil 124 has an initial diameter $D_i$ at an initial locus 206 at about the level of the blower, and the veil converges to a converged diameter $D_c$ narrower than the initial veil diameter $D_i$ at a converged locus 208 beneath the initial locus 206. Preferably, the polymer fibers 14 are directed into the veil so that a substantial portion (at least 75 percent), if not all, of the polymer fibers intersect the veil at the converged locus 208, or just slightly below (i.e., beneath and within 50 cm of the converged locus). It is to be understood that the polymer fibers 14 must have sufficient momentum in the horizontal direction in order to successfully intermingle with the glass fibers 12 before the glass fibers are collected. Otherwise there will not be a generally uniform distribution of the polymer fibers with the glass fibers, and all or substantially all of the polymer material will end up outside or on the top side of the collected fibrous product. A balance must be maintained to assure that the polymer fibers are aimed high enough into the glass fiber veil 124 for good penetration, and yet not so high that the polymer fibers encounter heat sufficient to melt too many of the fibers. It is important to retain a majority or, more preferably, a substantial amount of the organic material in fibrous form. Therefore, successful operation of the process will require that the polymer fibers operate within a relatively narrow time, temperature and momentum window of operating conditions, as will be appreciated by the skilled artisan.

As shown in FIG. 7, the method of the invention can be carried out using a direct formed fiber collection system. As shown, the spinner 112 produces a veil 124 of glass fibers. Polymer fiber dies 150 produce arrays 152 of polymer fibers, and direct the polymer fibers into contact with the glass fibers to integrate the polymer fibers with the glass fibers. Direct forming conveyors 214 such as those disclosed in PCT Application No. WO 95/30787, which is hereby incorporated by reference, are foraminous, and are provided with an air evacuation apparatus to assist in removing air from the integrated glass and polymer fibers. The integrated glass fibers and polymer fibers are gathered by converging direct forming conveyors 214 and collected on a conveyor 220 as a direct formed pack 222.

The direct formed pack can be taken through a product shaping oven 224 where hot gases within the range of from about 175° C. to about 250° C., and preferably at a temperature of about 204° C., are blown through the pack to slightly soften the polymer fibers 14 so that they bond to the glass fibers to form an insulation product having good pack integrity. Preferably, the pack 222 is under vertical compression during the product shaping process so that the product thickness is defined. Care must be taken not to heat the polymer fibers to such an extent that a majority of the polymer fibers melt or otherwise lose their fibrous form. It is important to retain a majority of the organic material in fibrous form. Preferably at least about 50 percent by weight of the polymer material is in the form of polymer fibers. More preferably, a substantial amount, or at least about 75 percent, of the polymer material is in fibrous form.

Immediately following the oven 124 is the cooling section 225 where the fibrous product is cooled while still held in vertical compression. After the pack passes through the product shaping oven 224 and cooling section 225, the fibrous product can optionally be passed through encapsulation equipment 226 which takes encapsulation material 16, such as for example, a thin film of polyethylene material, from a roll 228 and applies the film to the pack 222. Subsequently, the pack is cut into lengths by the chopper 230 to form encapsulated batts 232.

The polypropylene fibers are generally long when compared to the glass fibers, having an average length of at least 1 meter, and preferably having an average length an average length of at least 3 meters. In some cases, where the manufacturing process employs a product shaping step, the polymer fibers may be somewhat shorter than 3 meters because the polypropylene fibers will become discontinuous at localized positions along their length where the bonding between the polypropylene fiber and the glass fiber occurs. The glass fibers will be much shorter than the polypropylene fibers, having an average length less than about 10 in (25 cm). A preferred length is within the range of from about 4 to about 6 inches (about 10 to about 15 cm).

The fibrous insulation has a density within the range of from about 0.2 to about 2.0 pounds per cubic foot (about 3.2 to about 32 kg/m$^3$). A preferred density for the insulation batts 104 to be used in wall cavities 96, as shown in FIG. 2, is a density within the range of from about 0.4 to about 1.5 pounds per cubic foot (about 6.4 to about 24 kg/m$^3$). The glass fibers 12 preferably have an average diameter within the range of from about 4 to about 7 microns, and the polypropylene fibers 14 preferably have an average diameter within the range of from about 4 to about 25 microns, and preferably about 6 microns. The insulation product preferably has a recovery ratio of at least 6:1. This means that the product is shipped and stored at a packaged thickness, and when the packaging material is removed, the unrestrained insulation product expands or recovers to a thickness at least 6 times the packaged thickness.

An important product attribute of the insulation is its product integrity, which is the ability of the fibrous product to hold itself together when handled or picked up. Without product integrity the installer would not be able to pick up an insulation batt and hold it by one end to apply the batt to the wall insulation cavity 96. In conventional mineral fiber insulation products, such as conventional glass fiber insulation products, the integrity of the product is supplied by the bonding of intersecting fibers by the urea/phenol formaldehyde binder. Since the insulation batt is preferably binderless, the product integrity must be supplied by the entanglement and integration of the polypropylene fibers among the glass fibers. The term "binderless" means the absence of binder materials or the presence of only small amounts of such binder material, amounting to no more than one percent by weight of the total fibrous product including the binder. The presence of the polypropylene fibers are not considered a binder material. The addition of lubricants or suppressants, for such purposes as dust control, are not to be considered as part of the binder.

The product integrity can be measured using a parting strength test, which is ASTM test method C-686. The test consists of measuring the tensile strength in both the machine direction and the cross-machine direction for a number of samples of the insulation material. The parting strength is measured in units of pounds of force at failure per weight in grams of the product being tested. The insulation product is tested as originally received, i.e., directly out of the package. The insulation material is also tested after conditioning in an autoclave to assess the long term viability of the binder. One possible specification for parting strength in conventional fiber glass insulation is a requirement of a parting strength of at least 0.4 pounds per gram, prior to conditioning, and a parting strength of at least 0.2 pounds per gram after conditioning. The insulation product of the invention preferably has a parting strength of at least 0.4 pounds per gram prior to conditioning.

Since the product is binderless, the product has a tendency to form a rounded or pillow profile. Therefore, it may be advantageous to use an edge tucking method on the product during packaging of the product, as described in U.S. Pat. No. 5,578,258.

EXAMPLE I

A fiberizer for glass fibers was operated using standard wool glass with a throughput of 750 pounds per hour (341 kg/hr). The spinner was 15 inches in diameter (38 cm) and had 15,000 orifices to produce fibers having a diameter of about 7 microns. The spinner was operated at a speed of 2500 revolutions per minute. A polymer die was positioned to direct 5 micron polypropylene fibers from 38 melt flow polypropylene into the converged locus of the glass fiber veil. The die had a row of polymer orifices with an orifice density of 30 orifices per inch (about 12 orifices per cm) and a total length of about 12 inches (30.5 cm). The die had a throughput of about 25 pounds per hour (11.4 kg/hr). On either side of the row of polymer orifices was an air slot. The polymer openings had a diameter of about 20 mil (0.51 mm). The die was positioned at a 25 degree angle to the horizontal, positioned about 20 cm from the veil of glass fibers, and located about 50 cm below the spinner. The calculated polymer fiber speed at a distance 20 cm from the die was 150 meters per second. No organic binder was added, but an organic lubricant was sprayed onto the glass fibers in the veil, resulting in a lubricant content of about 0.1 percent by weight of the final product. Nearly all of the polymer fibers were collected.

The intermingled glass fibers and polymer fibers were collected in a direct formed process as a fibrous pack. An encapsulation step was used as a processing aid. A visual examination of the fibrous pack indicated that the polymer fibers were generally distributed throughout the pack, although not completely uniformly. About 80 percent of the polymer material was in the form of fibers, with about 20 percent of the polymer material in a remelted form. This was determined using a photo microscope. It is believed that the uniformity of polymer fiber distribution and the amount of polymer material remaining in fibrous form can be further improved through further experimentation with the variables above.

EXAMPLE II

The fibrous pack of intermingled glass fibers and polymer fibers of Example I, with the encapsulation material removed, was cut to a 15.5 inch by 4 ft. batt (39.4 cm by 122 cm) and placed in an oven under compression to a 1 inch thickness (2.54 cm) at 204° C. for 45 minutes to bond the polymer fibers to the glass fibers, and thereby to subject the fibrous insulation to product shaping. The batt was held in compression for 45 minutes further during cooling. It should be understood that the total time of compression, i.e., one and one-half hours, was much longer than would be expected in a commercial manufacturing line, and was for experimental purposes only. The resulting insulation product had a loss on ignition (LOI) of about 2.5 percent, of which approximately 0.1 was the lubricant. The batt had a good level of integrity down most of its length, with pack integrity being the ability of the fibers to stay together during handling. The product was able to be successfully installed in a wall cavity, without the benefit of any binder or encapsulation.

EXAMPLE III

The fibrous pack of intermingled glass fibers and polymer fibers of Example I was cut into a sample 12 inches by 12 inches by 3½ inches thick (30.5 cm by 30.5 cm by 8.9 cm thick) for testing. The density of the sample was 0.7 pounds per ft$^3$ (11.2 kg/m$^3$). The average glass fiber diameter was 7 microns. The average polymer fiber diameter was 5 microns. The sample was tested using ASTM test method C-518 and a guarded hot box to determine thermal conductivity. The results indicate that the sample had an improvement (decrease) in k value of nearly twenty k points compared to an all-glass fiber product having the same density and fiber diameter (to about 0.303 from about 0.32 BTU-In/(Hr.Ft$^2$-° F.) at a density of about 0.6 pcf (9.6 kg/m$^3$)). Subsequent burnoff of the polymer fibers showed that the polymer fibers constituted about 2.5 percent by weight of the sample.

EXAMPLE IV

The process of Example I was repeated without the benefit of the sprayed on lubricant. Without the lubricant, it was not possible to have the polymer fibers successfully penetrate the glass fiber veil, and the collected fibrous material consisted of a glass wool pack with a layer of polymer fibers forming a network or web on the top of the pack. The web of polymer fibers was bonded to the glass wool pack.

It can be seen by the above discussion that the introduction of relatively long and strong polymer fibers into the relatively short glass fibers can be used to effect different product attributes in insulation products produced according to the invention. The capability and flexibility of the invention will enable the construction of improved building structures having improved insulation products, with better weight distribution and better fiber distribution. Further, there is an improved control of the nature of the polymer fiber/glass fiber interface, including the degree of entanglement between the polymer fibers and the glass fibers. The fibrous pack can be subjected to a heat setting oven to soften the polymer fibers to an extent sufficient to bond the polymer fibers to the glass fibers without causing some of the polymer fibers to lose their fibrous nature. Further, surface layers of polymer fibers on fibrous products could be subjected to a heating process to convert the layer of polymer fibers into a bonded polymeric network for advantageous product qualities. Such a surface layer would make the resulting insulation product stronger and more amenable to handling without damage. Also, the fibrous pack could be subjected to a molding process in which either the whole fibrous pack or the surfaces of the pack could be molded under heat and pressure to form various insulation or structural products.

Additionally, the introduction of relatively long and strong polymer fibers into the predominantly glass fiber pack provides several significant advantages. First, it makes the pack more suitable for a needling process, which will enable the production of insulation products without traditional binders. Second, it advantageously provides greatly increased mechanical and tensile strength, thereby allowing the insulation products to exhibit improved handleability. For example, binderless wall cavity insulation products, capable of being picked up and held by holding one end, can be made using the method of the invention. Finally, the polymer fibers are lighter than glass fibers, and on a weight basis provide an increased surface area vis-à-vis glass fibers, thereby contributing to improved thermal and acoustical performance.

It will be evident from the foregoing that various modifications can be made to this invention. Such, however, are considered as being within the scope of the invention.

What is claimed is:

1. Fibrous insulation suitable for use in insulation cavities in buildings, the fibrous insulation being comprised of mineral fibers in an amount within the range of from about 90 to about 99 percent by weight, and organic material, in the form of organic fibers and organic particles, in an amount within the range of from about 1 to about 10 percent by weight, with the mineral fibers and the organic material being integrated together so that the organic material is distributed generally uniformly among the mineral fibers, with at least about 50 percent by weight of the organic material being in the form of organic fibers, and with the fibrous insulation being binderless.

2. The fibrous insulation of claim 1 in which the organic material is present in the fibrous insulation in an amount less than about 5 percent by weight of the fibrous insulation.

3. The fibrous insulation of claim 1 in which the organic material is present in the fibrous insulation in an amount less than about 3 percent by weight of the fibrous insulation.

4. The fibrous insulation of claim 1 having a density within the range of from about 0.2 to about 2.0 pounds per cubic foot (about 3.2 to about 32 kg/m$^3$).

5. The fibrous insulation of claim 1 having a parting strength of at least 0.4 pounds per gram, prior to conditioning.

6. The fibrous insulation of claim 1 in which the fibrous insulation is encapsulated with a plastic film.

7. The fibrous insulation of claim 1 in which at least about 75 percent of the organic material is in fibrous form.

8. The fibrous insulation of claim 1 having a recovery ratio of at least 6:1.

9. A binderless fibrous insulation suitable for use in insulation cavities in buildings, the fibrous insulation being comprised of mineral fibers, and organic material, in the form of organic fibers and organic particles, distributed generally uniformly among the mineral fibers, said organic material being present in the fibrous insulation in an amount less than about 5 percent by weight of the fibrous insulation, with at least about 50 percent by weight of the organic material being in the form of organic fibers.

10. The fibrous insulation of claim 9 having a parting strength of at least 0.4 pounds per gram, prior to conditioning.

11. The fibrous insulation of claim 10 in which the organic material has been bonded to the mineral fibers by heating the organic material to an extent sufficient to bond the organic material to the mineral fibers while retaining a majority of the organic material in fibrous form.

12. In combination, a building structure having insulation cavities, and fibrous insulation positioned within those cavities to insulate the building, wherein the fibrous insulation is comprised of mineral fibers in an amount within the range of from about 90 to about 99 percent by weight, and organic material, in the form of organic fibers and organic particles, in an amount within the range of from about 1 to about 10 percent by weight, and with at least about 50 percent by weight of the organic material being in the form of organic fibers.

13. The combined building structure and fibrous insulation of claim 12 in which the organic material is present in the fibrous insulation in an amount less than about 5 percent by weight of the fibrous insulation.

14. The combined building structure and fibrous insulation of claim 12 in which the fibrous insulation has a parting strength of at least 0.4 pounds per gram, prior to conditioning.

15. The combined building structure and fibrous insulation of claim 12 in which the fibrous insulation is encapsulated with a plastic film.

16. The combined building structure and fibrous insulation of claim 12 in which the fibrous insulation has a recovery ratio of at least 6:1.

17. The combined building structure and fibrous insulation of claim 12 in which at least about 75 percent of the organic material is in fibrous form.

18. The combined building structure and fibrous insulation of claim 12 in which the fibrous insulation has a recovery ratio of at least 6:1, the fibrous insulation is encapsulated with a plastic film, the organic material is present in the fibrous insulation in an amount less than about 5 percent by weight of the fibrous insulation, the mineral fibers and the organic material are integrated together so that the organic material is distributed generally uniformly among the mineral fibers, and the fibrous insulation has a parting strength of at least 0.4 pounds per gram, prior to conditioning.

19. The combined building structure and insulation of claim 12 in which the building structure has a plurality of wall cavities defined by wall studs, where the wall cavities are filled with the fibrous insulation, wherein the fibrous insulation is held in the wall cavities by a friction fit.

* * * * *